United States Patent
van der Lely et al.

(10) Patent No.: US 7,370,606 B2
(45) Date of Patent: May 13, 2008

(54) ARRANGEMENT FOR AND A METHOD OF MANAGING A HERD OF ANIMALS

(75) Inventors: Alexander van der Lely, Rotterdam (NL); Karel van den Berg, Bleskensgraaf (NL); Renatus Ignatius Josephus Fransen, Vlaardingen (NL); Eduard Lodewijk Meijer, The Hague (NL); Adrianus Maria Seerden, Rijnsburg (NL)

(73) Assignee: Lely Research Holding AG, Zug (CH)

( * ) Notice: Subject to any disclaimer, the term of this patent is extended or adjusted under 35 U.S.C. 154(b) by 128 days.

(21) Appl. No.: 10/073,015

(22) Filed: Feb. 12, 2002

(65) Prior Publication Data

US 2002/0108584 A1    Aug. 15, 2002

(30) Foreign Application Priority Data

Feb. 13, 2001 (NL) .................................... 1017353
May 11, 2001 (NL) .................................... 1018046

(51) Int. Cl.
*A01K 5/02* (2006.01)
*A01K 1/10* (2006.01)

(52) U.S. Cl. ................. 119/51.02; 119/51.01
(58) Field of Classification Search .............. 119/51.01, 119/51.02, 174
See application file for complete search history.

(56) References Cited

U.S. PATENT DOCUMENTS 3,465,724 A * 9/1969 Broadbent .................. 119/174
3,788,276 A * 1/1974 Propst et al. ................ 119/174
5,322,034 A * 6/1994 Willham et al. ............. 119/174
5,482,008 A * 1/1996 Stafford et al. .............. 119/174
5,526,772 A * 6/1996 Curkendall .................. 119/174
5,740,757 A * 4/1998 Smeester .................. 119/51.02
5,901,660 A * 5/1999 Stein .......................... 119/174
5,937,789 A * 8/1999 Platt ........................... 119/174
6,427,627 B1 * 8/2002 Huisma ................... 119/51.02

* cited by examiner

*Primary Examiner*—Bret Hayes
(74) *Attorney, Agent, or Firm*—Howery LLP

(57) ABSTRACT

A management system for domesticated animals, such as cows, which comprises an animal identification system, a central unit provided with a computer which has a memory. The memory contains for each animal of the herd data which relates to the animal's position or status in the hierarchic order of the herd. The memory also contains data for each animal relating to its jostling behavior. This management is used in an automated system wherein procedures such as feeding and milking are performed on animals of the herd. The position or status of each animal in the hierarchic order of the herd is determined and the data thereof are stored in the memory. At least one of the procedures affecting each animal in the herd is governed, at least in part, by data in the memory relating to the animal's status or position in the hierarchic order of the herd and also by data concerning the animal's jostling behavior.

35 Claims, 3 Drawing Sheets

ARRANGEMENT FOR AND A METHOD OF MANAGING A HERD OF ANIMALS

FIELD OF THE INVENTION

The invention relates to an arrangement for managing a herd of animals, said arrangement comprising an animal identification system.

BACKGROUND OF THE INVENTION

Such an arrangement is generally known. Although the arrangement functions satisfactorily and relieves a dairy farmer of a considerable amount of time-consuming work, in practice there appears to be a need for an improved arrangement, because, for example, great differences may occur in waiting time for admitting animals to a certain area.

It is an object of the invention to provide an arrangement for managing a herd of animals that provides improved management.

SUMMARY OF THE INVENTION

For that purpose an arrangement of the above-described type according to the invention comprises providing a central unit with a computer having a memory which includes data relating to the hierarchic order of animals in a herd. The invention is based on the insight that not only the arrangement for managing a herd is active for managing the herd, but that also the animals of the herd themselves participate in the management. In this connection especially the hierarchic order appears to play an important part. It occurs for example that a dominant animal pushes other animals away and is for example the first to take fodder. With dairy animals it often appears that a dominant animal wishes to be the first to enter a milking compartment and that other dairy animals are pushed away by this dominant animal. By this partially self-managing behavior of the animals of the herd the management carried out by the arrangement may be negatively influenced, which is not only undesirable for less dominant animals (undesired increase of waiting time for these animals), but also for the efficiency of the arrangement, for example when it comprises a milking robot. By taking into account, according to the invention, the hierarchic order within the herd, measures can be taken for providing an improvement both for the animals of the herd and the production of the arrangement.

In an embodiment an arrangement according to the invention is characterized in that there is provided a hierarchic order determining means for determining data in relation to the hierarchic order, said hierarchic order determining means supplying the determined data in relation to the hierarchic order to the memory that stores these data. Such a hierarchic order determining means may be constituted by the animal identification system, a camera or the like, possibly in combination with a computer. Due to this the arrangement generates itself the data in relation to the hierarchic order. Preferably the data are updated in the memory.

The herd is preferably managed by the arrangement at least with the aid of the data regarding the hierarchic order.

Although in general dominant animals try to be the first to gain access to an area or to obtain fodder, in some cases it may occur that dominant animals are the last to gain access, precisely because the first desire of these dominant animals is to dominate all the other animals. This behavior is also called "jostling behavior" and is present, as every farmer knows, to a greater or lesser extent with each animal. By not only taking the hierarchic order but also the jostling behavior into account, it is possible to obtain an optimally functioning arrangement. In an embodiment of an arrangement according to the invention this is achieved in that the memory is adapted to contain data for each animal in relation to the jostling behavior. The herd is preferably managed by the arrangement at least with the aid of the data regarding the jostling behavior.

If desired, the central unit may comprise an input means for inputting per animal by, for example, a farmer, data about the hierarchic order and about the jostling behavior. Additionally or alternatively these data may be generated by the arrangement itself.

In particular it has appeared that in the vicinity of gates the circulation may be negatively influenced by dominant, jostling animals. In an embodiment of an arrangement according to the invention said circulation can be improved when the arrangement is provided with an area for containing a number of animals, said area having an entrance gate and an exit gate, the operation of at least one of the gates being controlled at least with the aid of data from the memory.

In order further to promote the circulation said area is preferably provided with at least two, possibly juxtaposed, entrance gates and exit gates. As a result thereof the animals are enabled to choose another gate than that wherein passage is obstructed by a jostling animal.

The invention is in particular advantageously applied to an arrangement in which the area is constituted by a treatment area.

The treatment area is preferably constituted by a milking compartment provided with a milking robot. Precisely in the situation of a milking compartment provided with a milking robot the dominant and the jostling behavior may play an important part. Owing to the natural instinct of dairy animals to be milked, an animal may experience extremely much stress when it is prevented by a jostling animal from entering the milking compartment, which has a negative influence on the health of the dairy animal. Moreover, it may negatively influence the milk production. In an embodiment of an arrangement according to the invention, said disadvantageous behavior is prevented at least for the greater part when in front of the entrance gate or the entrance gates of the milking compartment a further area is provided having at least one entrance gate for containing a limited number of animals.

In order not to prolong unnecessarily the waiting time for dairy animals to enter the milking robot, an embodiment of an arrangement according to the invention is characterized in that the arrangement comprises a detection device for detecting animals in the further area and for issuing a detection signal, the detection signal indicating that animals are present in the further area keeping the entrance gate of the further area closed. As a detection device the animal identification may be used. As a result thereof first all the animals present in the further area are provided an opportunity to enter the milking compartment before new animals are admitted to the further area.

Further it has appeared that at feeding stations the eating behavior of certain animals may negatively be influenced by dominant, jostling animals. Therefore, the invention can in particular be applied advantageously to an arrangement provided with a feeding station with a feeding trough, an entrance opening to the feeding trough, a closing means for closing the entrance opening, and a feed supplying device for intermittently supplying an amount of fodder or drink or both into the feeding trough, the feeding trough being adapted to be closed at least with the aid of data from the memory.

To obtain optimal feeding of the animals of the herd, an embodiment of the arrangement according to the invention is characterized in that the arrangement comprises a feeding station with several juxtaposed feeding troughs, each feeding trough being adapted to be closed at least with the aid of data from the memory. When for example it is detected that an animal eating from a feeding trough is pushed away, the feeding trough can be closed. The animal that pushes away can then no longer obtain fodder from the relevant feeding trough and will soon leave said feeding trough, so that another animal, in particular the animal that has been pushed away, can regain access to the feeding trough by controlling the operation of the closing means by the computer with the aid of the data obtained from inter alia the animal identification system.

In a preferred embodiment of an arrangement according to the invention, the arrangement is provided with a detection device for determining the quantity of feed present in the feeding trough at a point of time after the supply of a quantity of fodder or drink or both to the trough and for issuing a first signal for operating the closing means based on the quantity determination. It has appeared that animals having made use of the feeding trough, even after there is no more feed present therein, still keep their heads in the feeding trough for a short to a longer period of time while waiting for additional feed that may still be supplied. As a result thereof another animal that is ready to be fed cannot gain access to the feeding trough immediately. According to the invention this is prevented by operating, after an animal has consumed at least a part of the quantity of fodder or drink or both, the closing means, that is by moving the closing means into the closing position, so that further access to the feeding trough is impossible for that animal. An animal that has just made use of the feeding trough is thus inclined to move away from entrance to the feeding trough.

The detection device preferably comprises a weighing device for weighing the quantity of feed present in the feeding trough. Said weighing device communicates whether or not there is feed present in the feeding trough. As a result thereof it is possible for the weighing device, after, for example, detecting that there is no more feed present in the feeding trough, to issue a signal which causes the closing means to close the feeding trough.

When the detection device includes a clock, it is possible to measure how long the quantity of feed in the feeding trough remains untouched. By setting, for example, an upper limit, after said upper limit has elapsed, that is after a predetermined threshold period of time has elapsed, the clock can issue a first signal for causing the closing means to close. In particular when data from the weighing device and the clock are combined, an extremely efficient use of the feed metering device is possible.

In a preferred embodiment the arrangement is provided with a clock for determining the duration from the supply of a quantity of fodder or drink or both and for issuing, based on the duration, a second signal for operating the closing means. The arrangement is preferably provided with a closing means operating device for operating the closing means on the basis of the first or second signal, or both.

An embodiment of an arrangement according to the invention is provided with a device for detecting jamming for the closing means. This prevents an animal from being injured during closing of the entrance opening to the feeding trough.

There is preferably provided an obstacle detector for detecting an obstacle in the entrance opening. Such an obstacle detector is preferably adapted to distinguish animals and other objects from each other.

Animals, after having taken the quantity of fodder, may knock or kick the feeding trough or a construction supporting same with force in attempting to obtain additional fodder. According to the invention this undesired behavior is prevented by providing an anti-violence detector. When said anti-violence detector, which may comprise, for example, a vibration detector, detects that the feeding trough has been knocked or the like, it issues a signal for operating the closing means for closing the feeding trough.

Preferably the feeding station is further provided with an animal identification device for identifying a particular animal that visits the feeding unit. Such an animal identification device can be used extremely advantageously for supplying a quantity of fodder or drink or both to the feeding trough. With the aid of data from the animal identification device, the operation of the closing means is controlled in an advantageous manner so that it is possible to forbid a particular animal to enter the feeding trough. Because the animal identification device is adapted to identify a particular animal, it is in particular suitable for obstructing an animal from using the feeding trough that wishes to make use of it at an undesired point of time. Moreover, the animal identification device is adapted to cooperate with the obstacle detector for obtaining an extremely efficient functioning of the obstacle detector.

An arrangement according to the invention is in particular characterized in that there is provided a device for issuing a warning signal indicating that the closing means is going to close. In this manner an animal is made aware that the closing means is going to close and thus it is possible to teach the animal to leave the feeding trough at the issue of the warning signal, which may be, for example, a sound or a light signal.

Not only jostling animals may cause a disturbance of the normal order of things at a feeding station, but also so-called "gourmets" may cause a disturbance. A gourmet is an animal that goes from one feeding trough to another and each time only takes a small quantity of fodder (usually the best part). Such a disturbance is avoided in an embodiment of an arrangement according to the invention because of the fact that the computer is programmed in such a manner that the closing means of a third feeding trough is operated when the data in the memory indicate that, within a predetermined period of time, an animal has taken less than a first quantity of fodder from a first feeding trough, and less than a second quantity of fodder from a second feeding trough. The first or second quantity, or both, preferably amounting to 0.75 kilograms, while the period of time preferably amounts to fifteen minutes.

The arrangement is preferably provided with a camera for observing the behavior of an animal. By means thereof and by means of other devices, such as the animal identification system, the data in the memory can be updated.

In order to be able to influence the behavior of dominant, jostling animals and to promote the management of the herd, the arrangement is provided with means of punishment for punishing animals impeding the management of the herd. Such means of punishment may preferably comprise loudspeakers, punishment means that are adapted to use an electric voltage or blowing means or the like.

It is particularly advantageous when the means of punishment comprise a punishment device that is movable from an invisible to a visible position. The punishment device is preferably constituted by an inflatable object which, for example, may be in the form of a cow, a wall or the like; a picture showing a frightening image; a partition wall or guide wall or the like.

It is particularly efficient when the means of punishment comprise a vehicle moving forward automatically. Said vehicle may for example be controlled by cameras and image recognition programs. However, a particularly accurately functioning vehicle is obtained when the animals are provided with an animal identification adapted to be detected by a positioning system for determining the position of the animal, and when the vehicle moving forward automatically is controlled at least with the aid of data from the positioning system. As a positioning system GPS may, for example, be used.

The disadvantage of jostling behavior for other animals can be obviated when the means of punishment comprise a punishment path that can be reached via an exit gate, so that the jostling animal is not rewarded for its behavior.

The invention also relates to a method of managing a herd of animals, in which method a number of automatic animal related procedures are performed, characterized in that the method comprises the step of determining the hierarchic order of an animal.

The performance of at least one of the automatic animal related procedures is preferably controlled at least on the basis of the determined hierarchic order of an animal.

An embodiment of a method according to the invention comprises the step of determining the jostling behavior of an animal, the performance of at least one of the automatic animal related procedures being controlled at least on the basis of the determined jostling behavior of an animal.

The animal related procedure comprises, in particular, opening or closing a gate. The animal related procedure preferably comprises providing access to a feeding trough.

The determination of the hierarchic order of the animals preferably takes place initially by manual input of data based on experience.

Alternatively or additionally the hierarchic order or the jostling behavior is determined and updated by determining the order in which animals of a herd enter leave an area.

It is advantageous when the hierarchic order and the jostling behavior are ascertained or updated, or both, by determining the order in which animals of a herd make use of a feeding or drinking station.

BRIEF DESCRIPTION OF THE DRAWINGS

The invention will be elucidated hereinafter by way of example with reference to the drawing, in which.

DETAILED DESCRIPTION OF THE PREFERRED EMBODIMENTS

Figure 1:
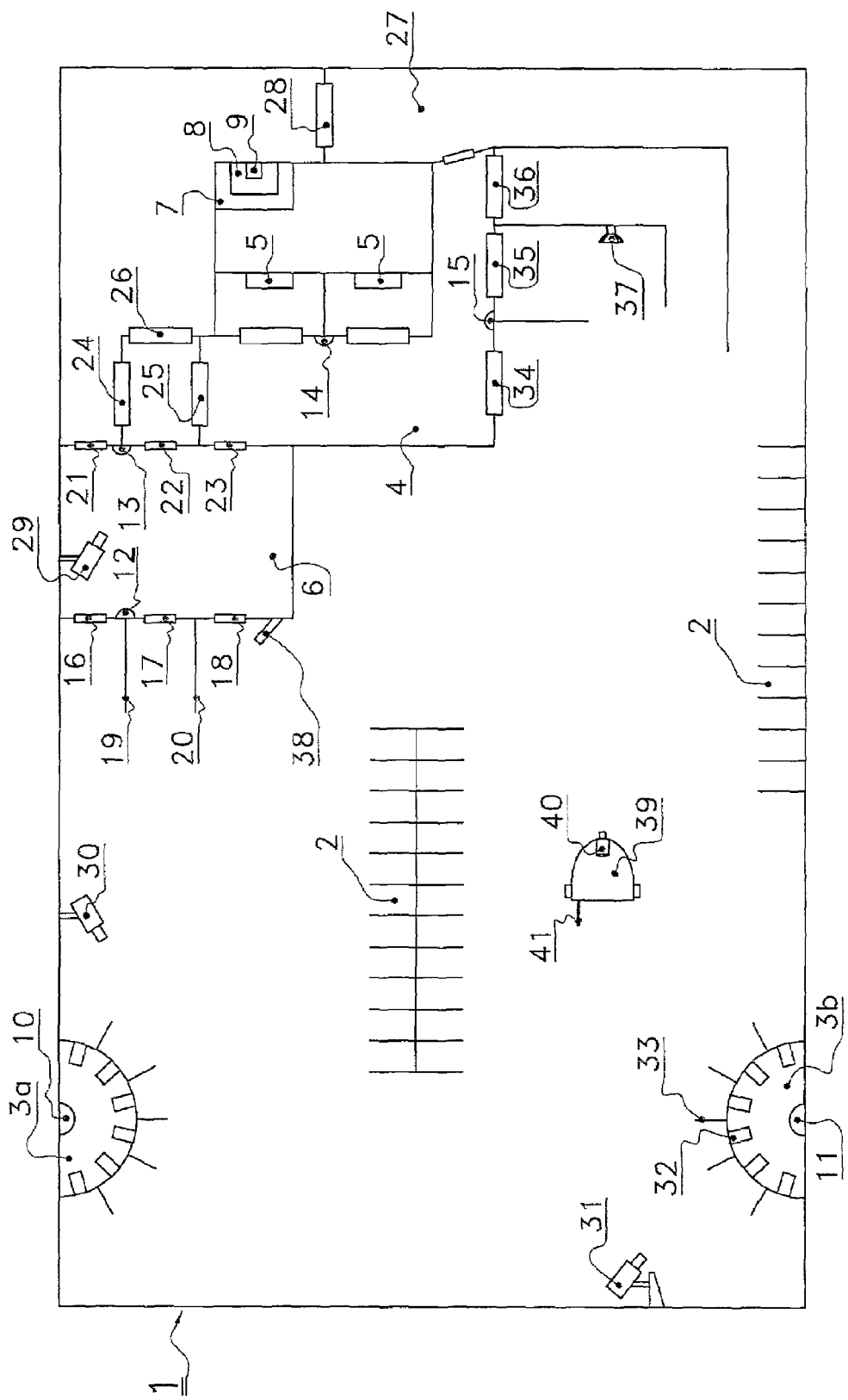
FIG. 1 shows a schematic plan view of an arrangement according to the invention.

FIG. 1 shows a schematic plan view of an arrangement according to the invention comprising a shed 1 for containing a herd of animals. Shed 1 comprises inter alia a number of cubicles 2, feeding stations 3a and 3b, a milking compartment 4 with milking robots 5, and a further area (waiting area) 6.

The arrangement is further provided with an animal identification system which comprises reading units 10, 11, 12, 13, 14 and 15 for reading the animal identification device worn by an animal, in particular a cow. As known, data from the animal identification are centrally stored by a central unit 7 provided with a computer 8 having a memory 9 containing several memory files. Central unit 7 centrally controls the functions of the arrangement.

The waiting area 6 has a number of entrance gates 16, 17 and 18 (in the embodiment shown three). In the case that the entrance gates 16, 17 and 18 are side-by-side, as shown, there may be disposed partitions 19 and 20. Waiting area 6 further has a number of exit gates 21, 22 and 23 (in the embodiment shown three). One of these exit gates as indicated by reference number 23 constitutes at the same time an entrance gate into milking compartment 4. There are further provided selection gates 24 and 25 by means of which animals coming from the other exit gates 21 and 22 may be guided to milking compartment 4. Exit gate 21 and a selection gate 26 can also give access to a punishment path 27 in which a waiting gate 28 may be provided.

In the embodiment shown each feeding station 3a and 3b has several, side-by-side, as shown, feeding troughs 32. A feeding station having, however, only one feeding trough can also be applied within the scope of the invention. Each feeding trough 32 is provided with a closing means for closing the entrance to the feeding trough.

According to the invention, memory 9 is provided for each animal of the herd with data in relation to the hierarchic order of the animal. These data can initially be inputted with the aid of the data based on the dairy farmer's experience. Additionally, when known, there can be inputted data for each animal relating to its jostling behavior into the memory. However, the data in relation to the hierarchic order and jostling behavior can also automatically be generated and updated by the arrangement.

The functioning of the arrangement according to the invention will be explained in further detail with reference to the entrance to milking compartment 4 and the operation of the feeding stations 3a and 3b, in particular the operation of the closing means for the feeding troughs. However, it will be appreciated that the invention is not limited to these two examples, but may be applied to all automatic animal related procedures that are customary in managing a herd of animals.

When dairy animals wish to make use of a milking robot 5 in the milking compartment 4, they first have to enter the waiting area 6 via one of the entrance gates 16, 17 or 18. When one of the entrance gates is blocked by a dominant, jostling animal, another animal can use one of the other two entrance gates. A reading unit 12 detects which cow is present at which gate. With the aid of data regarding the hierarchic order (and data regarding the jostling behavior, if any), and data regarding the history of the animal to be milked, central unit 7 is enabled to control the opening of the entrance gates. There is in particular provided a detection device, for example constituted by a counting device at the entrance gates or a camera 29 provided for detecting the number of animals in the waiting area 6. When a predetermined number of animals has been reached, it is possible for central unit 7 not to allow animals to enter the waiting area 6 until said area is completely empty. For that purpose the detection device supplies a detection signal to the central unit 7.

It is noticed that the camera 29 (and possibly other cameras) is not only adapted to determine the number of animals in the waiting area, but also to determine the behavior of the animals, for enabling updating of the data in the memory if desired.

When the limited, predetermined number of animals is present in waiting area 6, central unit 7 will control the entrance to milking parlor 4. Also in this case an animal can choose between several exit gates 21, 22 and 23. Central unit 7 opens one of these exit gates, based on, for example, data regarding milking history of hierarchic order, so that the waiting time per animal does not increase in an undesired manner. For that purpose there is provided reading unit 13. When an animal need not be milked, or shows an undesired jostling behavior, it is possible for the central unit to control the exit gates and the selection gates 24, 25 and 26 so that an animal is not guided to the milking compartment 4, but to a punishment path 27.

A dairy animal that has been milked by a milking robot 5 can leave milking compartment 4 through exit gates 34, 35 or 36. Also in this situation there are provided a number of gates, which are disposed side by side, because it has appeared that very dominant, jostling animals may wait for milked animals thus preventing them from leaving the milking compartment. Now that there are provided several exit gates, an animal that has been milked is able to choose a free exit gate.

Only when all the animals admitted to the waiting area 6 have been milked, or in any event have left the waiting area and the milking compartment, which can be detected by the reading units 13 and 15, are the entrances to the waiting area opened.

The gates controlled by central unit 7 also provide the possibility of punishing an animal for undesired behavior. When for example the presence of an animal at a certain gate is undesirable, said gate can be moved so that the animal is chased away. Furthermore, as described, the animal can further be guided via a punishment path. It is possible temporarily to apply an electric voltage to a gate (or to all the gates if desired).

Loudspeakers 37 issuing a sound that is unpleasant to animals may be used alternatively or additionally. There may further be used blowing means 38 for chasing animals away from locations where they are not undesired by means of a strong air flow.

A very effective means of punishment is provided by a vehicle 39 moving forward automatically. Said vehicle 39 may for example be controlled by cameras 29, 30, 31 and 40 and known image recognition programs. However, a particularly accurately functioning vehicle 39 is obtained when the animals are provided with an animal identification adapted to be detected by a positioning system for determining the position of the animal, and when the forward movement of vehicle 39 is automatically controlled at least with the aid of data from the positioning system. For that purpose the vehicle 39 may be provided with an aerial 41. Of course, the vehicle is also provided with means to apply punishment.

Due to the fact that each feeding trough 32 is adapted to be closed at least with the aid of data from the memory, a correct feeding behavior can be stimulated. When for example an animal eating from a feeding trough 32 is pushed away by another animal, this can be detected by a camera 31 or 30 or by an animal identification at feeding station 3a or 3b or other means and the relevant feeding trough 32 can be closed. The animal that does the pushing is then no longer allowed to obtain fodder from the relevant feeding trough 32 and will quickly leave said feeding trough 32, so that another animal, in particular the animal that has been pushed away, can regain access to feeding trough 32, with reference to FIGS. 2 and 3 the functioning of the arrangement at the feeding station will be set forth in further detail.

As described, the actions can be controlled on the basis of data, inputted manually by a farmer, in relation to the hierarchic order and the jostling behavior of the animals.

However, the arrangement may be self-educating, or such that the inputted data are updated continuously with the aid of means determining the hierarchic order and the jostling behavior of the animal. The hierarchic order and jostling behavior is preferably determined by determining the order in which animals of a herd enter respectively leave an area. This can take place by making use of, for example, a camera or the animal identification device. An extremely accurate indication of the hierarchic order and the jostling behavior are obtained by determining the order in which animals of a herd make use of a feeding or drinking station, or both. Also in this situation a camera or the animal identification can be used.

Although only a number of means of punishment are described, it will be appreciated that alternative means of punishment may be used, for example a punishment device that is movable from an invisible to a visible position. In this connection there may be an inflatable object, for example, in the form of a cow, a wall or the like, a picture showing a frightening image, a partition wall or guide wall or the like.

Figure 2:
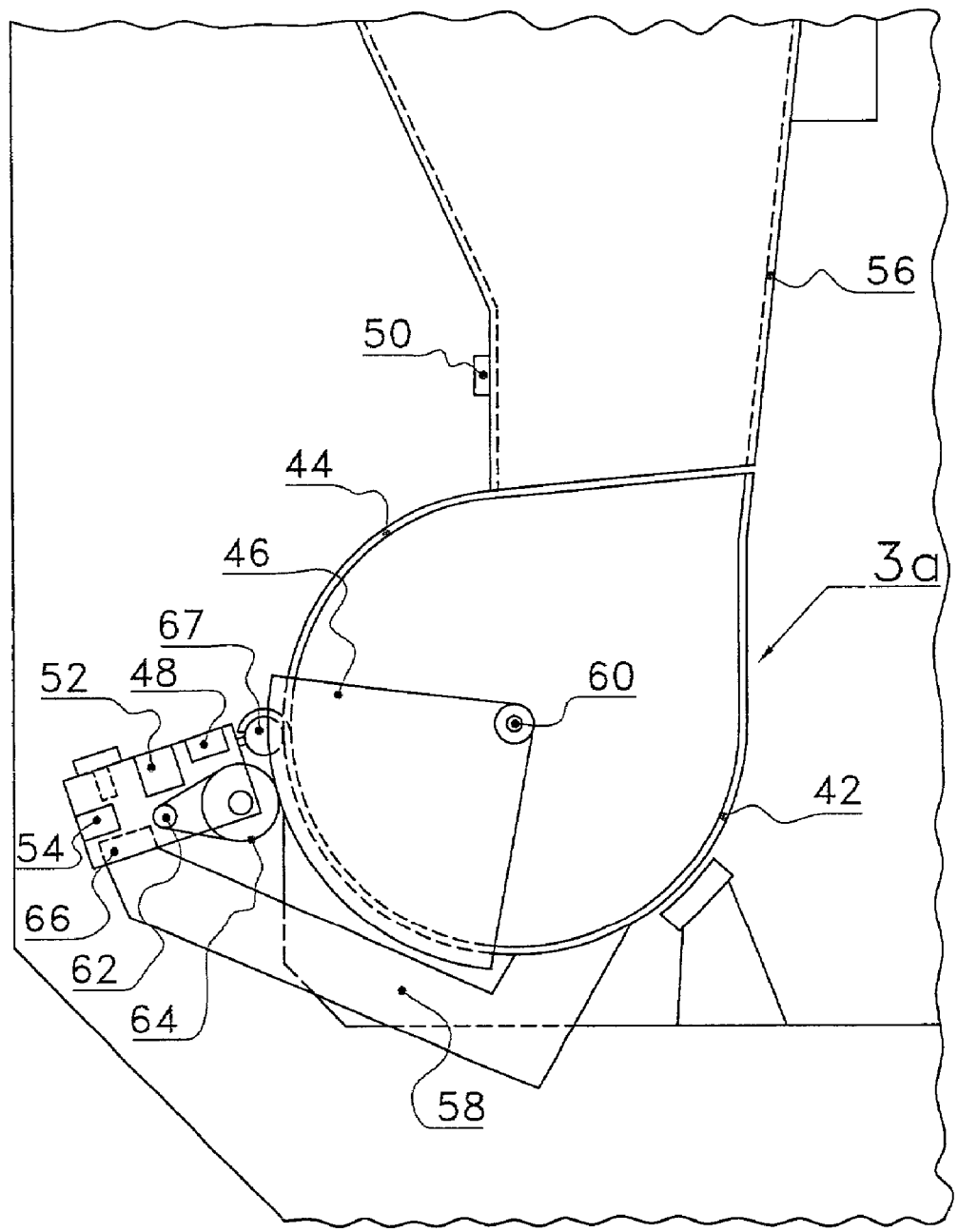
FIG. 2 shows a part of a feeding station in an embodiment of an arrangement according to the invention.

FIG. 2 shows schematically a part of an embodiment of a feeding station 3a according to an embodiment according to the invention. At feeding station 3a fodder or drink or both (hereinafter to be denoted by "feed," by which is meant fodder or drink or both) is supplied to an animal in metered portions. Feeding station 3a is provided with a feeding trough 42 for containing feed. An entrance opening 44 provides an animal, for example, but not exclusively, a cow, access to a feeding trough 42. An animal identification device 54 is preferably disposed at the feeding station 3a and recognizes a particular animal approaching feeding trough 42 to make use of it. A feed supplying device 56 supplies a quantity of feed into feeding trough 42, possibly with the aid of data from the animal identification device 54, the feed from a feed stock landing for feeding trough 42 via, for example, a cover and a chute.

Feeding station 3a is thus capable of recognizing a particular animal, such as a cow, by means of a transponder fitted on or to the cow. Feed supplying device 56 is controlled in a known manner by computer programs to ensure that the correct quantity of feed is supplied to the relevant cow.

A closing means 46 is movable across an entrance opening 44 of feeding trough 42. When closing means 46 is moved across the entrance opening 44, feeding trough 42 is made inaccessible to a particular animal, after which, as learned from practice, the animal will of its own accord leave the entrance to feeding trough 42 for a next animal. In the example shown, closing means 46 is constituted by a plate-like element that is capable of rotating about an axis 60. Said axis 60 may be constituted by an axle driven by a motor which, as will be described hereinafter, is controlled with the aid of data in relation to the quantity of feed present in the feeding trough.

Figure 3:
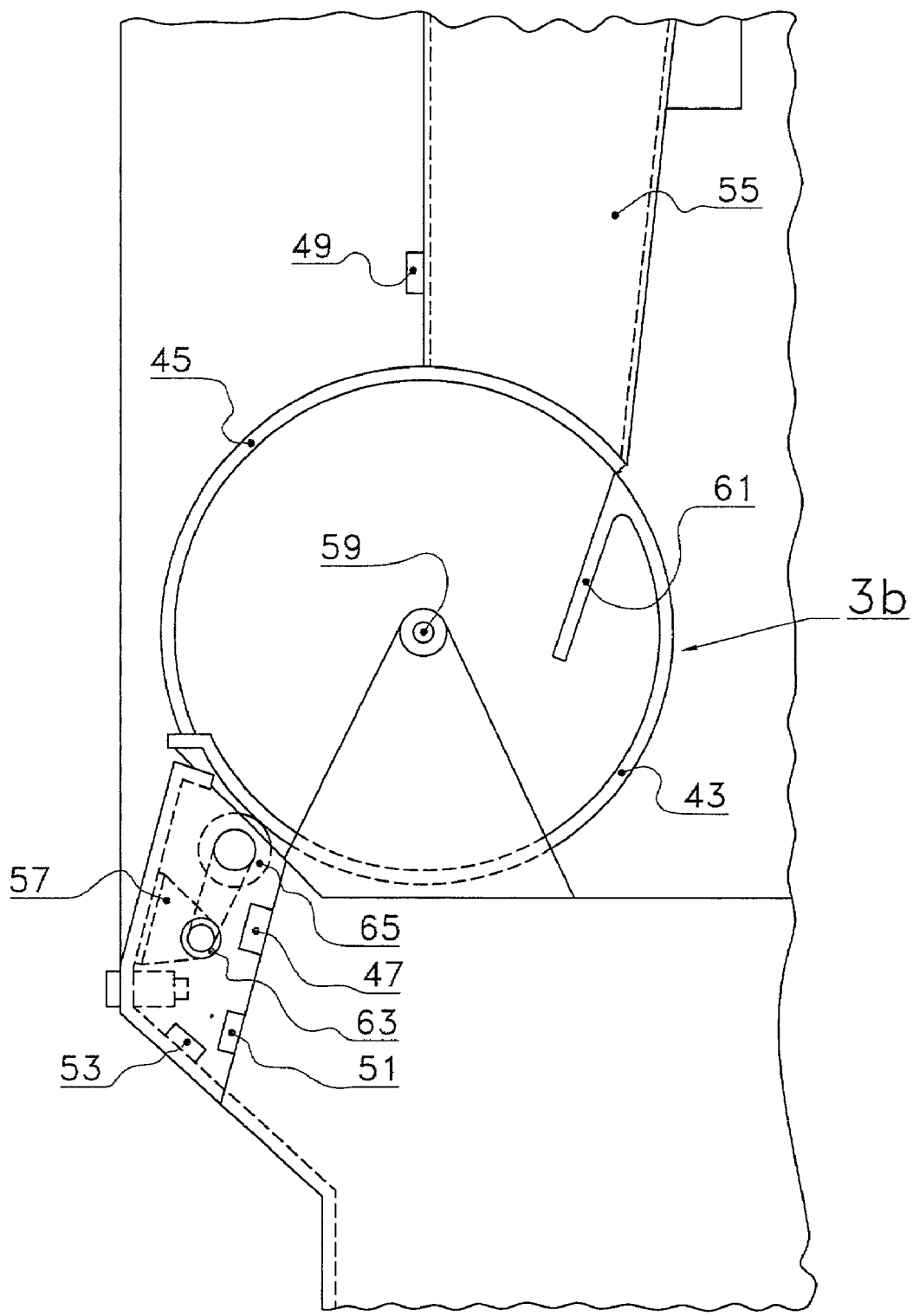
FIG. 3 shows a part of a feeding station in an alternative embodiment of an arrangement according to the invention.

FIG. 3 shows schematically a part of an alternative embodiment of a feeding station 3a. In this embodiment the closing means is constituted by a feeding trough 43 itself which is designed as a movable one. In the shown situation feeding trough 43 is rotatably disposed about an axis 59 that may be constituted by a motor-driven axle, said motor being controlled with the aid of data in relation to the quantity of feed present in the feeding trough, as will be elucidated hereinafter. In order to prevent that, in the position in which the feeding trough 43 closes the entrance opening 45, feeding trough 43 is provided with a wall portion 61 for catching remaining feed. Said wall portion 61 can also act as a feed guide means for feed that is supplied by a feed supplying device 55 into feeding trough 43.

In the embodiments described, the closing means rotates about an axis, the closing means being driven by a motor controlled with the aid of data in relation to the quantity of feed present in the feeding trough. For the purpose of providing, not only a simple but also a reliable and compact construction, a roll 64 or 65 is preferably driven by a motor 62 or 63, which roll 64 or 65 contacts closing means 46 or 43. According to the invention the feeding stations 3a and 3b are provided with a corresponding detection device 58 or 57 for detecting, after the supply of a quantity of fodder or drink, or both, that at least a part of the quantity of feed from the feeding trough 42 or 43 has been removed and for issuing thereupon a signal for operating closing means 46 or 43. Thus, after an animal has consumed at least a part of the quantity of feed, if said animal remains standing at the feeding trough 42 or 43, by operating the closing means 46 or 43 after receipt of a signal from the detection device 58 or 57, the animal will be induced to leave. Accordingly, an animal that has just made use of the feeding trough is then induced to leave the entrance to the feeding trough. Such a detection device may be constituted for example by a camera capable of giving an estimation of the quantity of feed present in the feeding trough by means of an image recognition program.

However, the detection device is preferably constituted by a known weighing device for weighing the feed present in the feeding trough. With these means it can be determined how much feed a particular animal has used, and also whether remaining feed is present in the feeding unit. Closing means 46 and 43 are then preferably controlled with the aid of data both from the animal identification device and data from the weighing device, so that the eating behavior of a particular animal can be taken into account. The weighing device is capable of measuring whether or not, after the supply of a quantity of feed into the feeding trough, there is still feed present in the feeding trough, and how much remaining feed is left. As a result thereof the weighing device, for example after detection that there is no more feed present in the feeding trough, can issue a signal for operation of the closing means for closing the feeding trough.

A shown in FIG. 2, the weighing device is constituted by a device 58 for determining the degree pivoting of feeding trough 42, and for deducing therefrom the weight of the feed present in feeding trough 42. In this situation feeding trough 42 is supported by a load sensor 66 via a supporting arm, feeding trough 42 pivoting about a hinge pin 67.

In the embodiment of FIG. 3 the weighing device comprises the movable feeding trough 43 for weighing the feed present in the feeding unit. The feeding trough 43 is moved in a reciprocating manner by a motor 63 driving a roll 65. As a result of this movement there occurs a torque, the magnitude of which is determined by a device 57 for measuring the magnitude of the torque. Device 57 deduces the weight of the feed present in the feeding trough from the torque determined. The exact correlation between torque and quantity of feed can previously be determined by means of simple calibration tests.

Detection devices 58 and 57 preferably include a clock, so that it is possible to measure how long the quantity of (remaining) feed in the corresponding feeding trough 42 or 43 remains untouched. By setting for example an upper threshold, after said upper threshold has elapsed, that is after a predetermined threshold period of time has elapsed, the clock can issue a signal for closing means 46 or 43. In particular when data from the weighing device and the clock are combined, an extremely efficient use of the feed metering device is possible. This makes it possible for example to use for each animal a combination of data in relation to a lower threshold for remaining feed and an upper threshold for the time for operating the corresponding closing means 46 or 43. Thus the closing means are operated when less than the lower feed threshold is present in feeding troughs 42 and 43 longer than the threshold time. As a non-limiting example approximately 2% to 10% of the quantity of feed supplied by the feed supply device to the feeding trough may be a threshold for the quantity of remaining feed, and approximately ten to sixty seconds as a threshold period of time.

The embodiments of a feed metering device shown in FIGS. 2 and 3 are provided with a respective device 48 or 47 for detecting jamming for closing means 46 and 43. Thus it is prevented that an animal is injuring during closing of the entrance opening to the feeding trough. A known device for detecting jamming exists, for example, for automatically closing car windows. When the device for detecting jamming detects a jamming, said device ensures by controlling the closing means that the latter releases the entrance gate. Preferably the closing means is re-closed automatically after a short time, such as less than two seconds. When an animal does not release the feeding trough after the first closing of the closing means, the closing means will repeat the closing action until the entrance opening is completely closed. When the closing means continues to open and close, there may be a defect. Consequently it is advisable for an alarm signal to be issued after a selected maximum number of anti-jamming openings has been reached. Said alarm may be audible, visible or otherwise.

Obstacle detectors 50 and 49 are provided for detecting an obstacle in the entrance opening. Such an obstacle detectors 50 and 49 are preferably suitable for distinguishing animals and other objects from each other. For that purpose, the combination of same with the animal identification device is advantageous, although image recognition equipment is possible as well. An obstacle could for example be constituted by the hand of a person cleaning the feeding trough, it being apparent that the closing means must not be closed when the hand is present in the entrance opening.

The embodiments of the invention according to FIGS. 2 and 3 also comprise an anti-violence detector 52 and 51 for detecting undesired kicking, knocking or the like against parts of feeding stations 3a and 3b. When the anti-violence detectors 52 and 51, which may comprise, for example, a vibration detector, detect when a part is being kicked or knocked or the like, then said detector issues a signal for operating the corresponding closing means 46 or 43 for closing the feeding troughs 42 and 43.

There is preferably provided a device for issuing a warning signal, such as a sound signal or a light signal, or both, indicating closing of the closing means, so that the animals are warned of closing.

Not only jostling animals may cause a disturbance of the normal order of things at a feeding station, but also so-called gourmets may cause a disturbance. A gourmet is an animal going from one feeding trough (or feeding station) to another and each time only takes a small quantity of fodder (usually the best part). Such a disturbance is avoided according to the invention in that the computer is programmed in such a manner that the closing means of a third feeding trough is operated when the data in the memory indicate that an animal has taken within a predetermined period of time less than a first quantity of feed from a first feeding trough and less than a second quantity from a second feeding trough. The first or second quantity, or both, preferably being about 0.75. kilograms (another quantity being possible), while the period of time preferably amounts to fifteen minutes (another period of time being possible).

Although we have disclosed the preferred embodiments of an invention, it will be understood that it is capable of other adaptations and modifications within the scope of the following claims:

The invention claimed is:

1. An arrangement for managing a herd of domesticated animals which comprises an animal identification system, at least one feeding trough which is disposed and dimensioned so it can only feed one of said animals at a time, said feeding trough including closure means for selectively precluding said animals from consuming feed therefrom, a central unit provided with a computer having a memory, hierarchy order determining means for determining data as to the status of each said animal in said herd, said hierarchy order determining means supplying said data so determined to said memory, said memory storing said data, said data supplied by said hierarchy order determining means being continuously updated in said memory that stores said data, said memory containing said data for each animal of the herd relating to the status of each said animal in the hierarchy order of the herd, said data being utilized to aid in the management of the accessibility of each animal of said herd to said feeding trough.

2. An arrangement for managing a herd of domesticated animals which comprises an animal identification system, at least one feeding trough which is disposed and dimensioned so it can only feed one of said animals at a time, said feeding trough including closure means for selectively precluding said animals from consuming feed therefrom, a central unit provided with a computer having a memory, said memory containing data for each animal of the herd relating to the status of each said animal in the hierarchy order of the herd, said data being utilized to aid in the management of the accessibility of each animal of said herd in said feeding trough, an area being provided for containing animals of said herd, said area having an entrance gate and an exit gate, the operation of at least one of said gates being controlled with the aid of said data in said memory.

3. An arrangement in accordance with claim 2, wherein said area is provided with at least two entrance gates and two exit gates.

4. An arrangement in accordance with claim 3, wherein said area comprises treatment means.

5. An arrangement in accordance with claim 4, wherein said treatment means comprises a milking compartment having a milking robot.

6. An arrangement in accordance with claim 5, wherein said milking compartment includes entrance means and exit means, a further area being provided which comprises said entrance gate and limit means for containing a predetermined limited number of said animals of said herd.

7. An arrangement in accordance with claim 6, which comprises a detection device for detecting the number of animals in said further area and issuing a detection signal that indicates that said animals are present in said further area, said computer maintaining said entrance gate of said further area closed after said predetermined number of said animals of said herd have entered and remain in said further area.

8. An arrangement for managing a herd of domesticated animals which comprises an animal identification system, at least one feeding trough which is disposed and dimensioned so it can only feed one of said animals at a time, said feeding trough including closure means for selectively precluding said animals from consuming feed therefrom, a central unit provided with a computer having a memory, said memory containing data for each animal of the herd relating to the status of each said animal in the hierarchy order of the herd, said data being utilized to aid in the management of the accessibility of each animal of said herd to said feeding trough, a feeding station is provided in said area, said feeding station including said one feeding trough and said closure means, said closure means adapted to be closed with the aid of data in said memory.

9. An arrangement in accordance with claim 8, wherein said feeding trough is juxtaposed with another like feeding trough which includes another closure means adapted to be closed with the aid of data from said memory.

10. An arrangement in accordance with claim 9, comprising a detection device for determining the quantity of fodder or drink, or both, present in said feeding trough at a predetermined point of time after a supply of said quantity of fodder or drink, or both, was received in said feeding trough and for issuing a first signal for operating said closure means based on the result of said quantity determination.

11. An arrangement in accordance with claim 10, wherein said detection device comprises a weighing device that weighs the quantity of feed present in said feeding trough.

12. An arrangement in accordance with claim 11, wherein said detection device comprises a clock.

13. An arrangement in accordance with claim 12, wherein said clock determines the duration from the supply of said quantity of fodder or drink or both into said feeding trough and for issuing, based on the result of the determination of such duration, a second signal for operating said closing means.

14. An arrangement in accordance with claim 8, comprising detection means for detecting jamming of said closure means.

15. An arrangement in accordance with claim 8, comprising an obstacle detector for detecting an obstacle in an entrance to said feeding trough.

16. An arrangement in accordance with claim 8, comprising an anti-violence detector.

17. An arrangement as claimed in claim 8, comprising a warning signal indicator that indicates that said closure means is about to close said feeding trough.

18. An arrangement in accordance with claim 8, wherein said feeding station is provided with an animal identification means for identifying an animal at said trough, said closure means being operated with the aid of data from said animal identification means.

19. An arrangement in accordance with claim 8, wherein said feeding station comprises a second feeding trough and a third feeding trough which are both similar to said first mentioned feeding trough, said computer being programmed so that a closure means at said third feeding trough is operated to close said feeding trough when data in said memory indicate that, within a predetermined period of time, an animal of said herd has consumed less than a first quantity of fodder from said first mentioned feeding trough and less than a second quantity of fodder from said second feeding trough.

20. An arrangement in accordance with claim 19, wherein said first quantity or said second quantity or both is 0.75 kilograms.

21. An arrangement in accordance with claim 19, wherein said predetermined period of time is 15 minutes.

22. An arrangement for managing a herd of domesticated animals which comprises an animal identification system, at least one feeding trough which is disposed and dimensioned so it can only feed one of said animals at a time, said feeding trough including closure means for selectively precluding said animals from consuming feed therefrom, a central unit provided with a computer having a memory, said memory containing data for each animal of the herd relating to the status of each said animal in the hierarchy order of the herd, said data being utilized to aid in the management of the accessibility of each animal of said herd to said feeding trough, and a camera for observing the behavior of animals in said herd.

23. An arrangement for managing a herd of domesticated animals which comprises an animal identification system, at least one feeding trough which is disposed and dimensioned so it can only feed one of said animals at a time, said feeding trough including closure means for selectively precluding said animals from consuming feed therefrom, a central unit provided with a computer having a memory, said memory containing data for each animal of the herd relating to the status of each said animal in the hierarchy order of the herd, said data being utilized to aid in the management of the accessibility of each animal of said herd to said feeding trough, and discipline means for disciplining animals impeding the management of the herd.

24. An arrangement in accordance with claim 23, said discipline means comprising loudspeakers.

25. An arrangement in accordance with claim 23, wherein said discipline means comprises means for applying an electrical voltage to animals of said herd.

26. An arrangement in accordance with claim 23, wherein said discipline means comprises blowing means.

27. An arrangement in accordance with claim 23, wherein said discipline means is movable from a position where it is not visible to an animal of said herd to be disciplined to a position where it is visible to such animal.

28. An arrangement in accordance with claim 27, wherein said discipline means comprises an inflatable object.

29. An arrangement in accordance with claim 28, wherein said inflatable object consists of a form of a cow, a wall, a picture showing a frightening image, a partition wall or a guide wall.

30. An arrangement in accordance with claim 23, wherein said discipline means comprises a path that includes an exit gate and detours a milking compartment with a milking robot therein.

31. An arrangement in accordance with claim 23, wherein said discipline means comprises an automatically movable vehicle.

32. An arrangement in accordance with claim 31, comprising means for determining the position of an animal identified by said animal identification means and for moving said vehicle in the direction of the position of said animal by controlling said vehicle automatically with the aid of data from a positioning system.

33. An arrangement in accordance with claim 32, wherein said positioning means comprises GPS.

34. An arrangement for managing a herd of domesticated animals which comprises an animal identification system, at least one feeding trough which is disposed and dimensioned so it can only feed one of said animals at a time, said feeding trough including closure means for selectively precluding said animals from consuming feed therefrom, a central unit provided with a computer having a memory, said memory containing data for each animal of the herd relating to the status of each said animal in the hierarchy order of the herd, said data being utilized to aid in the management of the accessibility of each animal of said herd to said feeding trough, said means for determining the hierarchy order of each animal of said herd comprises a camera.

35. An arrangement for managing a herd of domesticated animals which comprises an animal identification system, at least one feeding trough which is disposed and dimensioned so it can only feed one of said animals at a time, said feeding trough including closure means for selectively precluding said animals from consuming feed therefrom, a central unit provided with a computer having a memory, said memory containing data for each animal of the herd relating to the status of each said animal in the hierarchy order of the herd, said data being utilized to aid in the management of the accessibility of each animal of said herd to said feeding trough, and means for determining the order in which animals enter or leave an area for determining the hierarchy order of animals in said herd.

\* \* \* \* \*